(No Model.) 3 Sheets—Sheet 1.

G. F. NEALE & M. P. ELLIOTT.
MACHINE FOR GRINDING AND SMOOTHING PLATE GLASS.

No. 348,766. Patented Sept. 7, 1886.

(No Model.) 3 Sheets—Sheet 2.

G. F. NEALE & M. P. ELLIOTT.
MACHINE FOR GRINDING AND SMOOTHING PLATE GLASS.

No. 348,766. Patented Sept. 7, 1886.

Attest,
Jos. W. Crookes
J. S. Hornsby

Inventors,
Geo. F. Neale
Matthew P. Elliott
Paul Bakewell
their attorney (No Model.) 3 Sheets—Sheet 3.
G. F. NEALE & M. P. ELLIOTT.
MACHINE FOR GRINDING AND SMOOTHING PLATE GLASS.
No. 348,766. Patented Sept. 7, 1886.
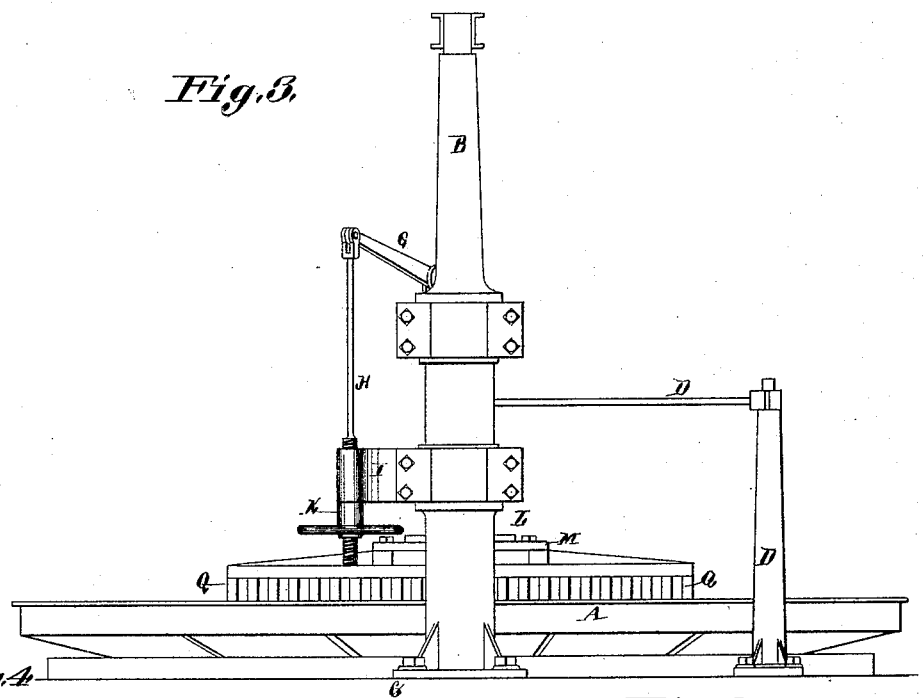
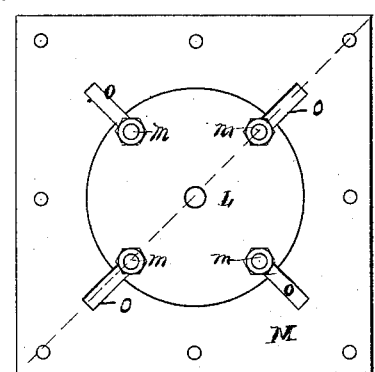
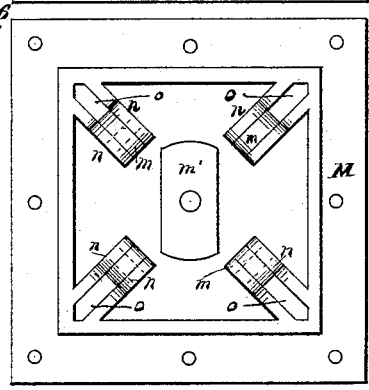
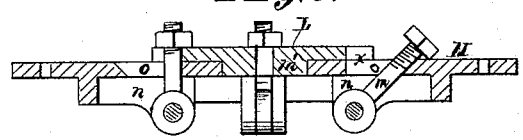
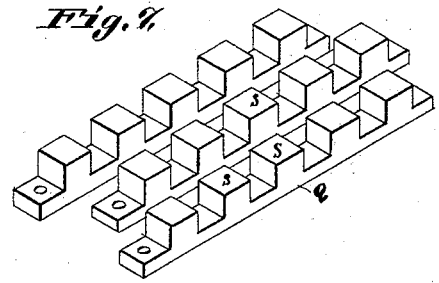
Inventors:
Geo. F. Neale
Matthew P. Elliott
Paul Bakewell
their attorney
Attest:
Jos. W. Crookey
J. L. Krinsby

UNITED STATES PATENT OFFICE.

GEORGE F. NEALE AND MATTHEW P. ELLIOTT, OF CRYSTAL CITY, MISSOURI.

MACHINE FOR GRINDING AND SMOOTHING PLATE-GLASS.

SPECIFICATION forming part of Letters Patent No. 348,766, dated September 7, 1886.

Application filed November 9, 1885. Serial No. 182,249. (No model.)

*To all whom it may concern:*

Be it known that we, GEORGE F. NEALE and MATTHEW P. ELLIOTT, of Crystal City, in the State of Missouri, have made a certain new and useful Improvement in Machines for Grinding and Smoothing Plate-Glass, of which the following is a full, clear, and exact description, reference being had to the annexed drawings, forming part of this specification, in which—

Figure 1:
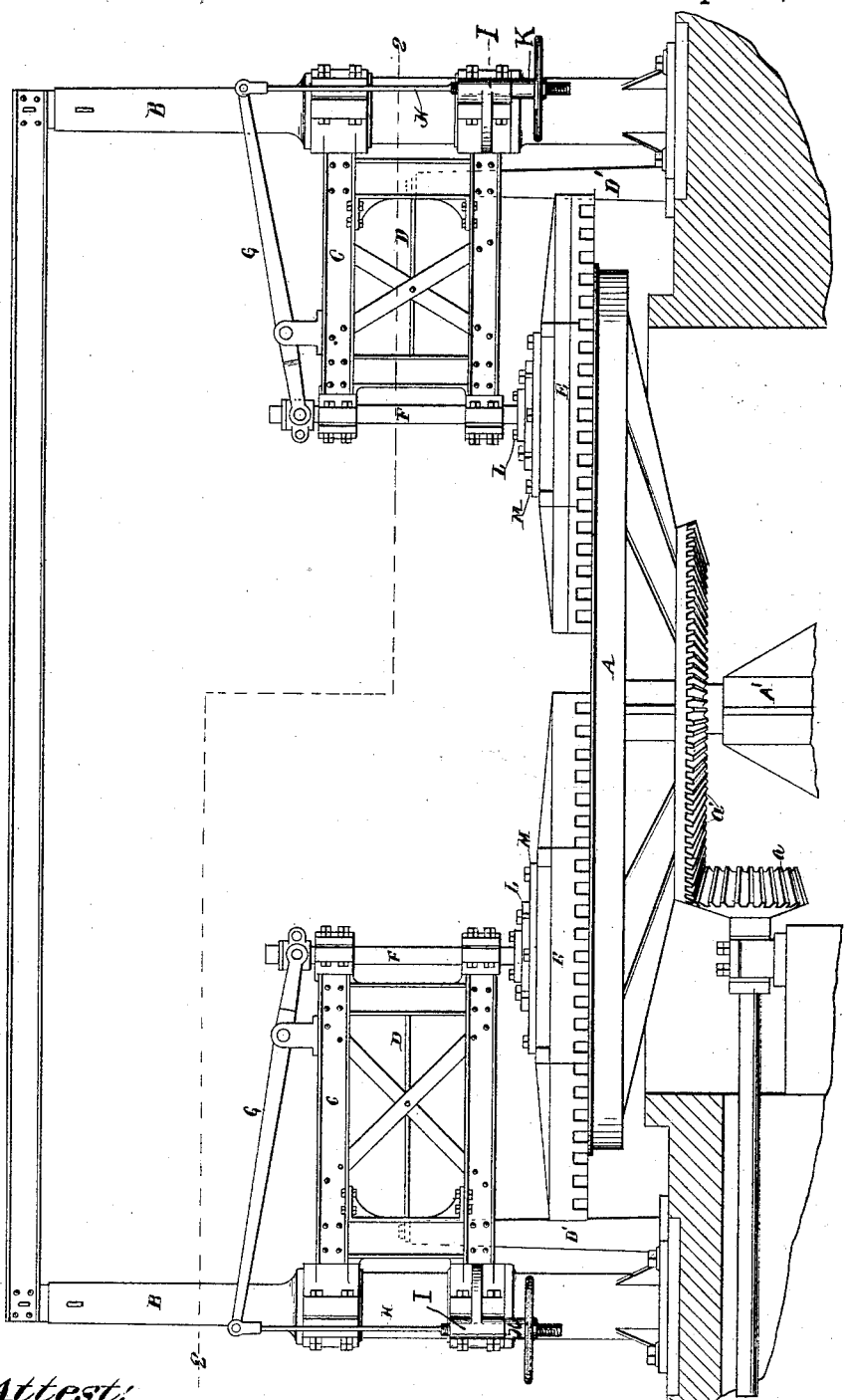
Figure 2:
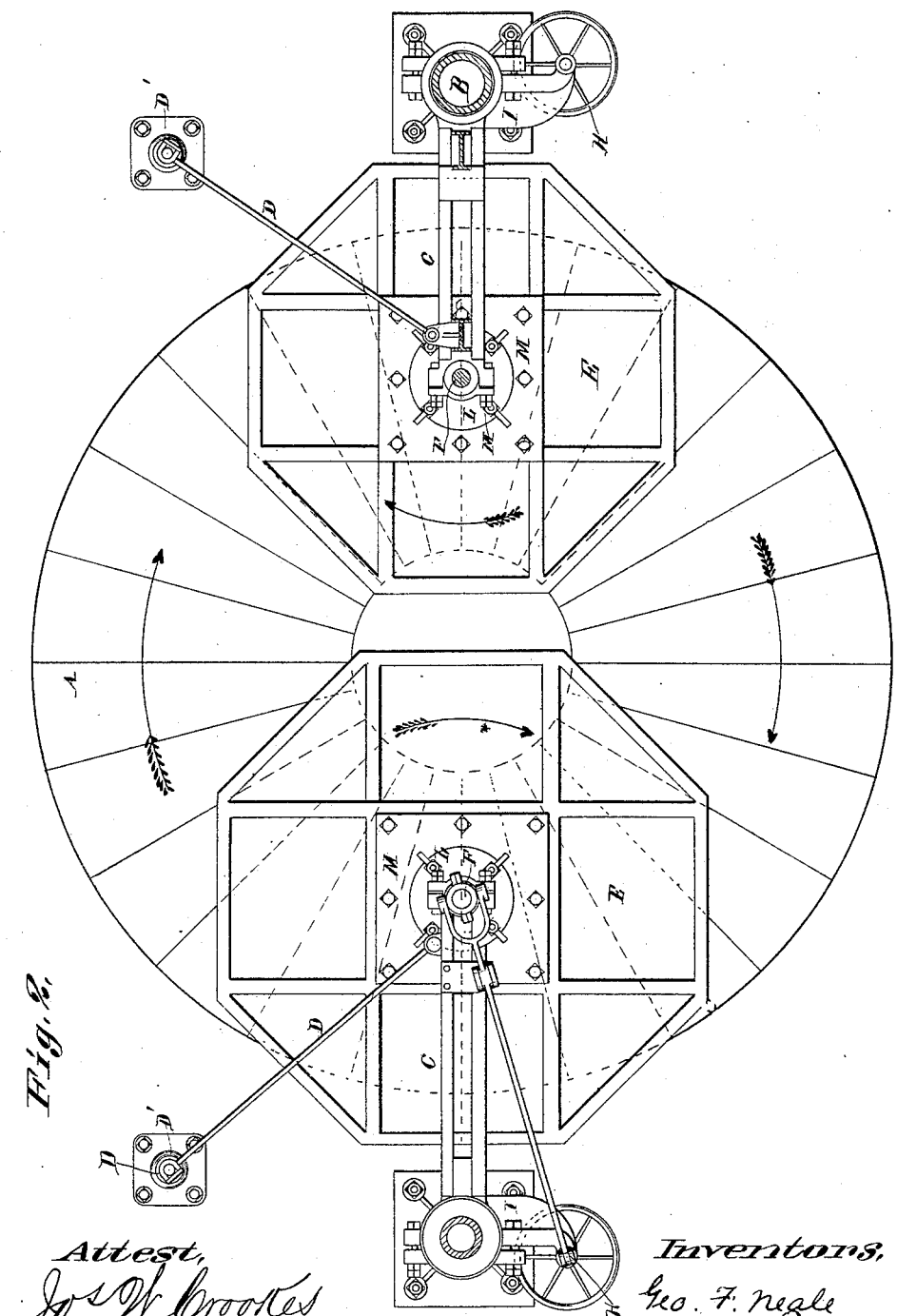

Figure 1 is a front elevation of our grinding and smoothing machine. Fig. 2 is a horizontal section on line 2 2 of Fig. 1. Fig. 3 is an end elevation of the same. Fig. 4 is an enlarged top view of detaching-plate. Fig. 5 is a plan view of the under side of the detaching-plate. Fig. 6 is a vertical section of the detaching-plate on line 6 6 of Fig. 4. Fig. 7 is a detailed perspective view of the grinder-face.

Like letters of reference indicate like parts wherever they appear.

Heretofore it has been the practice in the manufacture of plate-glass, after taking the glass from the annealing-ovens, to subject the glass to three distinct treatments, to wit:

First, placing the glass on a grinding-table upon which, by suitable machinery, the rougher surface of the glass is taken off, this being done by using a large revolving table, on which the glass is placed, one or more surfaces being hung in such relation to the revolving table and to the glass that this surface or grinder will revolve upon the glass on the revolving table, and thus the friction of the upper surface or grinder upon the glass, with the assistance of same or other like material, removes the roughness of the glass.

The next step is what is commonly known as the "smoothing process." This has heretofore been done by placing a plate of glass upon a stationary table, holding the glass in position by means of cement or other suitable material, placing a plate of glass on the table above the first plate of glass, attaching the upper plate of glass by means of weights or other suitable means to an upper grinding-surface, and then causing the upper plate of glass to move with the said moving surface upon the lower plate of glass, so that the friction of these plates of glass one against the other, aided by emery and water, will cause the glass to have a smoother surface.

The last step in the process is the polishing, to undergo which the glass is first removed from the smoothing-table, and then by suitable devices, unnecessary to describe here, all slight imperfections in the regularity of the surfaces of the glass are removed.

In this old process a large per cent. of the plate-glass is lost by breakage in removing the glass from the grinding-table to the smoothing-table, and besides this, the plates of glass are not removed from one table to the other without great loss of time and at great expense of skilled manual labor, for not only must these plates of glass be removed and carried from one table to the other, but they must also be adjusted with great nicety on each table.

The object of our invention is to provide a machine that will do away with the necessity of removing the glass from a grinding to a smoothing table, and upon which the grinding and smoothing process can alternately take place, and to so connect our runners or the upper grinding and smoothing surfaces with the rest of the machine that they may be readily taken apart for repairs, and that they may be readily swung off the revolving table to permit of the glass being turned, washed off, or removed, without dismantling the machine.

Our invention also relates to an arrangement by means of which our runners or upper grinding and smoothing surfaces can be lowered upon the glass on the table gradually, so as not to let the full pressure of the grinders fall upon the plates of glass at the start.

Our invention also relates to a special construction of the face of our runners or upper grinding and smoothing surfaces, with a view of allowing sand in the grinding process and the emery in the smoothing process to be forced evenly upon all parts of the glass.

The construction of our invention is as follows:

A represents our revolving table. It is preferably made to revolve on a certain spindle having its bearings in the step A', (see Fig. 1,) rotary power being imparted through the beveled pinion and cog-wheels $a\ a'$, or by any of the well-known methods of imparting rotary motion to a like device. The upper surface of this table A is preferably plated, so as to form a smooth surface, with boiler-iron made in separate sections, as shown by Fig. 2. This forms a hard even surface for the glass to rest upon, and being in sections it is easily repaired should any part become worn or injured.

B B are two upright pillars situated opposite to each other and on either side of the table A. Two heavy brackets, C C, are hung upon these pillars B B in any suitable manner, preferably as indicated by Fig. 1 of the drawings, so that they may be allowed to swing on their pivot-pillars B B. These brackets may be made of any suitable material; but they are preferably of iron, and they form bearings for the vertical shafts which support the runners or upper grinding and smoothing surfaces, and are held in position, extending toward each other and over the table A, by means of the tie-rods D D or other equivalent devices, which extend to the brackets from the posts D' d'. (See Fig. 2.) These tie-rods D D are capable of being connected to or disconnected from the brackets C C at will. When the tie-rods are disconnected from the brackets C C, the brackets can swing around on their pivots B B and off the table.

E E are our runners or upper grinding and smoothing surfaces. They are preferably not of the same diameter, it being desirable to have one of them of such diameter that in its revolutions it will pass the center of the table, and one of a smaller diameter to aid in grinding and smoothing the glass, but not to interfere with the operation of the larger runner. These runners are connected so as to operate as follows: A vertical shaft, F, is provided for each one of the runners E E. These shafts F F are firmly attached at their lower ends, each one to a runner E, and above their point of connection with the runners the shafts F are loosely journaled in the ends of the brackets C C.

Thus far described, it will be noticed that no provision is made to prevent the runners E from resting their full weight upon the table A or upon the glass which may be situated on the table A. However, we have a preferable construction which will prevent the full weight of the runners E from falling upon the glass, and which will regulate the degree of pressure of the runners upon the glass on the table. It will also be noticed that the runners E, the shafts F of which are journaled in the ends of the brackets C, will follow the position of the brackets C, and that when either one of the brackets C is swung off the table its runner E will also be moved off the table.

The means which we preferably use for the regulation of the pressure of the runner E on the glass is the following: The lever G is fulcrumed to each bracket C, so that the short arm of the lever will be connected with the upper end of each of the runner-shafts F, (see Fig. 1,) and so that the long arm of the lever will extend toward the pivotal ends of the brackets C, and preferably to pillars B, as shown in Fig. 1. The end of the long arm of lever G is connected with a vertical rod, H, this rod H being preferably threaded at its lower end. (See Figs. 1 and 3.) This rod H passes through a journal, I. At the end of rod H, below the journal I, is attached a threaded sleeve, K, and this sleeve K is squared to receive a wrench, or otherwise arranged so as to be screwed up and down on the end of the rod H.

The operation of the apparatus is this: The plates of glass being placed upon the table A, the brackets C C are swung into position opposite to each other, and so that the runners E E, which they carry, will rest upon the glass on the table in the position indicated by Figs. 1 and 2 of the drawings. Rotary motion is then imparted to the table A, which motion, by friction, imparts rotary motion to the runners E E, which turn readily on their loosely-journaled shafts F F, and in opposite directions, as indicated by the arrows in Fig. 2. As the runners E E rotate upon the glass, sand is thrown upon the table and is taken up by the surfaces of the runners and ground against the glass in the grinding process. When desirable to apply the smoothing process, the glass is not removed from the grinding-table to another table, as in the old process; but, without dismantling the machine, the tie-rods D are unfastened and the brackets C, with their runners, are swung off the table, and the glass, the face of the runners, and the table, if necessary, is washed off, and the brackets C and their runners are then swung back again into position on the table, and the tie-rods are fastened, and as the table is revolved the runners again revolve, and emery and water being thrown upon the table, the smoothing process takes place; but it may not be desirable, especially where heavy runners are used, to allow the full pressure of the runners on the glass at once, and to that end we have devised the means herein described. By turning the sleeve K we lift the shaft F and its runners E off the glass and table, and turning the sleeve in the opposite direction on the rod H, the shaft F and its runners E are gradually lowered upon the glass and on the table. By this means the pressure of the runners can be regulated at will.

We have also devised a special construction for runners or upper grinding-surfaces, which enables these runners to be taken apart for repairs; and we also preferably construct the face of our runners or upper grinders in a special manner with a view to the more thorough distribution of the sand or emery upon the surface of the plates of glass to be ground or smoothed.

We preferably construct our runners E on a plate or frame, L, which is bolted or otherwise firmly attached to the lower end of the shaft F.

A detaching plate or frame, M, to which the grinder-surfaces are mediately or immediately attached, is detachably connected with the plate or frame L, as follows: Bolts m, preferably four in number, are hinged in sockets n in the under part of the frame M. (See Figs. 5 and 6.) These bolts project through slits O of the frame M. (See Figs. 4 and 6.) This frame M is preferably provided with a central opening, m', to receive a projection, m², or upper frame, L, (see Fig. 6,) which upper frame is also provided with slots corresponding in number to the slots O of the lower frame, M, the slots of the frame L opening into and overlapping the slots O of the frame M. (See Fig. 6.) Now, as the upper frame, L, is placed upon the lower frame, M, and its slots being brought into line with the slots O of the frame M, the bolts theretofore having been in the position of the right-hand bolt m of Fig. 6, the bolts being then through the slots of the lower frame, M, and the corresponding slots of the upper frame, L. When in this position, as indicated by the left-hand bolt in Figs. 4 and 6, the nuts are tightened on the bolts, as shown by the left-hand bolt of Fig. 6, and the upper and lower frames or plates are securely locked. When desirable to unlock them, the nuts of the bolts are loosened and the bolts thrown into the position of the right-hand bolts in Fig. 6, so that the lower plate, M, may be readily removed.

The faces of our runners or grinder-surfaces are made of plates of metal or other suitable material that will present a smooth surface and stand the great friction. These plates Q are provided with projections S, of equal depth and preferably rectangular in form, (see Fig. 7,) and the plates Q are either connected directly with lower plates, M, by means of bolts and nuts or other well-known and suitable means; or they may be attached to the lower plate, M.

It will readily be seen that our grinder-plates can form the grinding-surfaces of runners which are not detachable.

We claim—

1. In a machine for grinding and smoothing plate-glass, the combination of a revolving table to receive the plates of glass, one or more grinding or smoothing runners loosely journaled, a hinged bracket in which the runner is journaled, a lifting-lever mounted on the hinged bracket and pivoted to the shaft of the runner, a lifting-rod pivoted to the end of the lever and threaded at its lower end, and a threaded nut engaging with the lifting-rod and the bracket, so as to raise and lower the runner as is desired, substantially as and for the purpose described.

2. In a machine for grinding and smoothing plate-glass, the combination of the revolving table, one or more grinding or smoothing runners journaled in a hinged bracket, a raising or lowering lever fulcrumed on said bracket, devices, substantially as described, for operating the lever, and a tie-rod hinged to said bracket and detachably secured to a stationary standard, substantially as and for the purpose described.

3. In a machine for grinding or smoothing plate-glass, a runner composed of an upper frame or plate, L, having a central projection and slots, substantially as described, a lower plate or frame, M, having a central opening, m', to receive the projection of the plate L, slots O, and bolts m, with their nuts hinged in sockets n, the whole combined and operating substantially as described, and for the purpose specified.

In testimony whereof we have affixed our signatures, in presence of two witnesses, this 5th day of November, 1885.

GEO. F. NEALE.
MATTHEW P. ELLIOTT.

Witnesses:
LOUIS PHILLIPPI,
FRED. BUTLER.